United States Patent [19]

Peterson

[11] Patent Number: 4,832,234

[45] Date of Patent: May 23, 1989

[54] PLUG

[75] Inventor: Francis C. Peterson, Woodbury, Conn.

[73] Assignee: Buell Industries, Inc., Waterbury, Conn.

[21] Appl. No.: 194,875

[22] Filed: May 17, 1988

[51] Int. Cl.⁴ .............................................. B65D 39/00
[52] U.S. Cl. .................................... 220/306; 220/307
[58] Field of Search ............... 220/306, 307, 256, 348, 220/353

[56] References Cited

U.S. PATENT DOCUMENTS

| Re. 30,326 | 7/1980 | Van Buren, Jr. | 220/307 X |
| 2,497,827 | 2/1950 | Trafton | 220/307 |
| 3,278,066 | 10/1966 | George et al. | 220/307 X |
| 3,990,604 | 11/1976 | Barnett et al. | 220/307 |
| 4,094,436 | 6/1978 | Birmingham | 220/307 X |
| 4,534,088 | 8/1985 | Ricke | 220/307 X |
| 4,560,083 | 12/1985 | Danico | 220/307 |

Primary Examiner—Steven M. Pollard
Attorney, Agent, or Firm—St. Onge, Steward, Johnston & Reens

[57] ABSTRACT

An improved plug for an aperture such as the paint drain hole in an automotive body comprises an integral flat body having two opposed aligning protuberances and two opposed engaging protuberances formed adjacent the edge of the body. At least one engaging protuberance is angled radially outwardly and has sufficient spring qualities to allow a snap mount of the plug into the aperture.

16 Claims, 2 Drawing Sheets

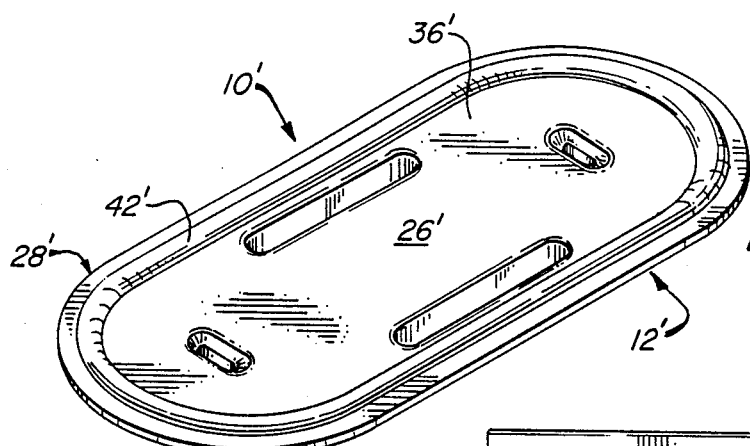
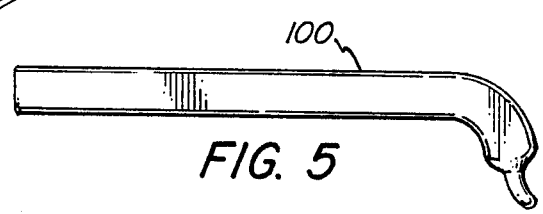
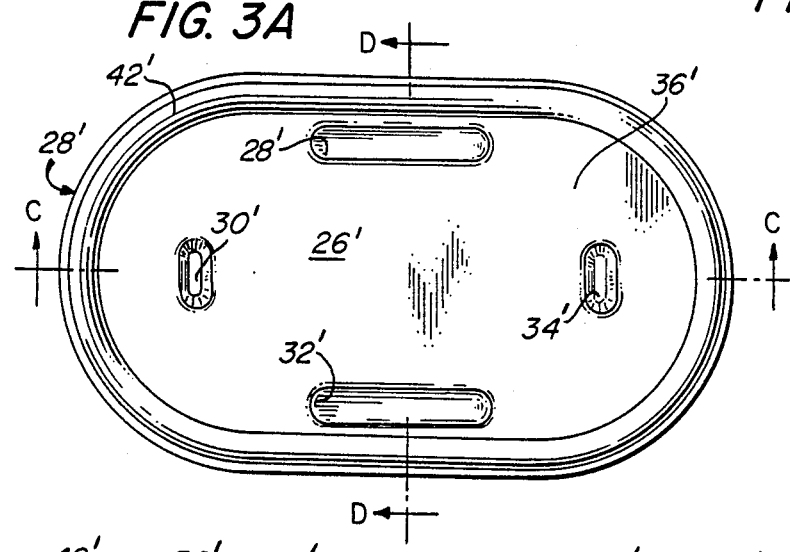
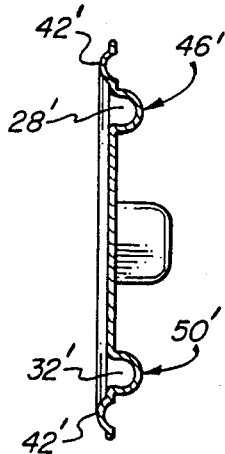
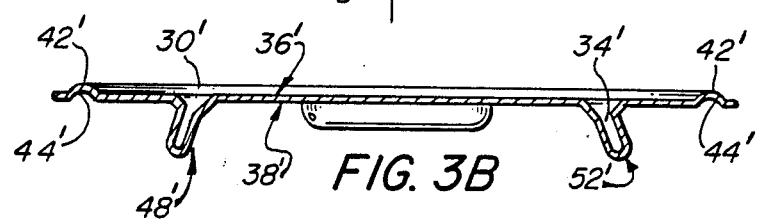
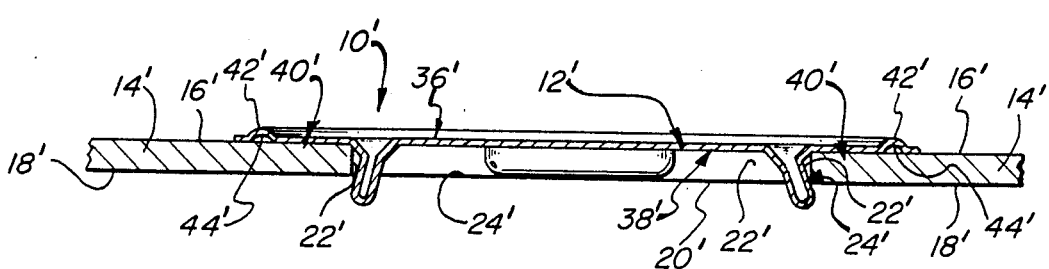

PLUG

BACKGROUND OF THE INVENTION (1) Field of the Invention

This invention relates to an improved plug having at least one finger means for retaining the plug in an aperture in a workpiece.

(2) Discussion of the Prior Art

Closure devices, such as impact or bang plug assemblies, are known in the prior art for engaging a workpiece to close or seal an aperture formed therein. A typical application for a bang plug is to close circular openings in the sheet metal of an automobile underbody, which openings were cut so that excess paint residue could drain out through the openings when the entire body was dipped in a paint bath.

U.S. Pat. No. 4,634,018 to Becker discloses one impact plug assembly. Other closure assemblies are shown in U.S. Pat. No. 4,091,962 to Van Buren, Jr.; U.S. Pat. No. 3,990,604 to Branett et al.; U.S. Pat. No. 3,994,107 to Wallace et al.; and U.S. Pat. No. 4,391,384 to Moore, III et al.

SUMMARY OF THE INVENTION

An improved plug is provided for engaging a workpiece to close an apertures therein. The plug of the present invention comprises a relatively thin, substantially planar shaped body with no openings extending therethrough. The body has formed at the perimeter thereof a number of protuberances for engaging the aperture sidewalls and aligning the body with respect to the apertures. In addition to providing an alignment function, at least one of the protuberances comprises a finger that is angled in a radially outward direction to lockingly engage the workpiece in the region of the aperture sidewall to restrain the plug from being pulled or displaced out of the aperture once it is installed. The finger can be bent by a bending tool to so engage the sidewall. The body, including the finger, can also be formed of a material having a sufficient spring constant to permit flexing while popping or snapping the plug into position; thereafter, the exertion of a radially outward force as a result of spring loading inherent in the body and finger material retains the plug in place.

It is an object of the present invention to provide an improved plug having no crossbar.

It is a further object of the present invention to provide an improved plug having no holes in the plug itself.

It is a further object of the present invention to provide an improved plug wherein the plug is only one skin thick and there is no seam to seal.

It is a further object of the present invention to provide an improved plug that can be inserted and sealed into an apertures in a workpiece with ease and with minimal striking or banging of the plug.

It is a further object of the present invention to provide an improved plug that can be easily installed using a ring seal.

Further objects and advantages of the present invention will become apparent from the following description of the drawings and preferred embodiment.

BRIEF DESCRIPTION OF THE DRAWINGS

FIG. 3 shows a perspective view of another preferred embodiment of the plug of the present invention in an uninstalled condition.

FIG. 3A shows a top view of another preferred embodiment of the plug of the present invention in an uninstalled condition;

FIG. 3B shows a side view of the plug of FIG. 3A in cross-section taken along the lines C—C of FIG. 3A;

FIG. 3C shows a side view of the plug of FIG. 3B in cross-section taken along the lines D—D of FIG. 3A;

FIG. 4 shows a side view of the plug of FIG. 3 as installed in partial cross-section; and FIG. 5 shows a tool for assistance in installing the plug.

DETAILED DESCRIPTION OF THE PREFERRED EMBODIMENT

Figure 1:
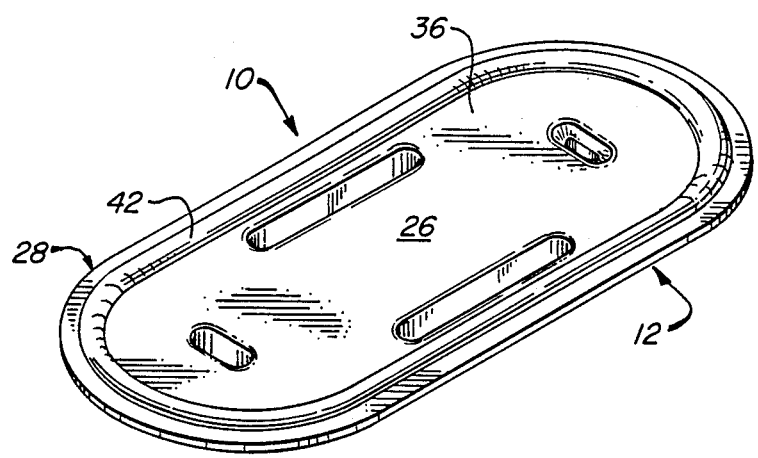
FIG. 1 is a perspective view of one preferred embodiment of the improved plug of the present invention in an uninstalled condition.
Figure 2:
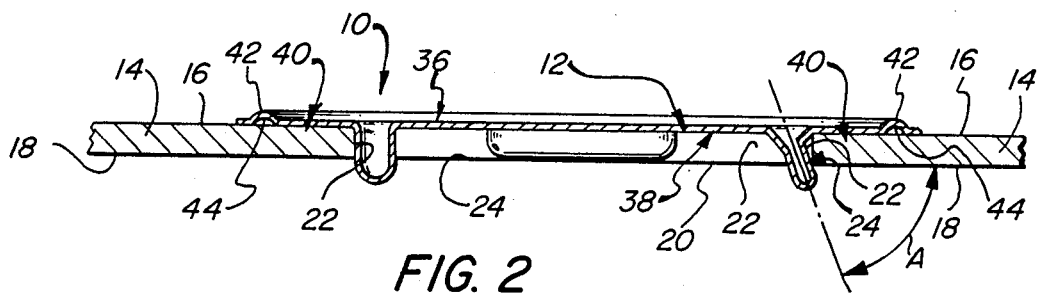
FIG. 2 shows a side view of the plug assembly of FIG. 1 in a partial cross-section, as installed in an aperture in a workpiece.

As seen in FIGS. 1 and 2, the improved plug 10 of the present invention comprises a plug 12 having a number of protuberances described in detail below. Plug 12 is generally stamped or pressed from a sheet of metal such as 1010 steel and may be treated by galvanizing to prevent corrosion, although the plug may also be formed of other materials such as aluminum. Plug 12 is preferably a unitary piece with no seams or apertures in the plug body.

Plug 12 is a preferably a round or oval shaped body and is substantially planar.

As shown in FIG. 2, plug 12 can be of any chosen size of diameter to fit into and seal a correspondingly shaped and sized aperture in a workpiece. It is understood, however, that any shaped plug corresponding to any shaped aperture can in principle be used consistently with the present invention.

As further seen in FIG. 2, a typical workpiece for receiving the improved plug 12 of the present invention is a section of sheet metal with an aperture cut therein, such as an automobile body with a paint drain hole. FIG. 2 depicts a workpiece 14 of a chosen thickness generally having an outer surface 16 and an inner surface 18. It is understood that the terms "inner" and "outer" are used for convenience only and are not intended to limit the scope of the present invention.

An apertures 20 passes through the workpiece 14, the aperture 20 being defined by at least one boundary or sidewall 22. If the aperture 20 is other than round or oval, such as for example rectangular, it may be said to have more than one sidewall. Sidewall 22 joins inner surface 18 along a region denoted as an inner rim or juncture 24, which extends all the way around the aperture 20.

As shown in FIG. 1, one preferred embodiment of the present invention includes a plug 12 comprising a relatively thin, substantially planar-shaped body 26 defined by a perimeter 28. Perimeter 28 is of a sufficient magnitude to permit body 26 to completely cover a corresponding aperture 20 for which it is intended.

Body 26 has no openings therethrough, even through a variety of depressions 28, 30, 32, and 34 therein form the structure for aligning the body 26 and retaining body 26 in the aperture 20. The fact that the plug 12 of the present invention has no holes therein is advantageous over the prior art, because the slots necessary for the prior art crossbar lever may provide an opening for dirt, gases, or other contaminants to pass through. For example, in the automobile industry it is particularly desirable that holes in the sheet metal body be sealed as thoroughly as possible to keep out noxious fumes from the engine and the roadway.

Body 26 has a first side 36 for facing away from aperture 20 and a second side 38 for facing toward aperture 20. Second side 38 abuts workpiece 14 in the regions 40 adjacent aperture 20.

Body 26 further comprises a flange 42 extending adjacent to and around the perimeter 28 of body 26. Flange 42 further forms a groove 44 open to the second side 38 of body 26. Groove 44 is adapted for receiving a sealant, such as a plastisol and foaming agent, as disclosed in co-owned and copending U.S. pat. application Ser. No. 914,650, the disclosure of which is hereby incorporated by reference, to provide a relatively secure seal between second side 38 and outer surface 16 of workpiece 14 in the region 40. Use of this sealant can provide a more effective closing off of the aperture. It is of course understood that the present invention can be used without this sealant.

With reference to FIG. 1, it can be seen that the first side 3 of plug body 26 has a number of depressions 28, 30, 32, and 34 formed therein with their respective corresponding protuberances 46, 48, 50, and 52 extending from the second side 38 of plug body 26. These protrusions extend into the aperture 20 to align the plug 12 with respect to the aperture 20 and workpiece 14, as well as cooperate with the sidewall 22 to snugly retain the plug 12 in the aperture 20, as described in more detail below.

Figure 1A:
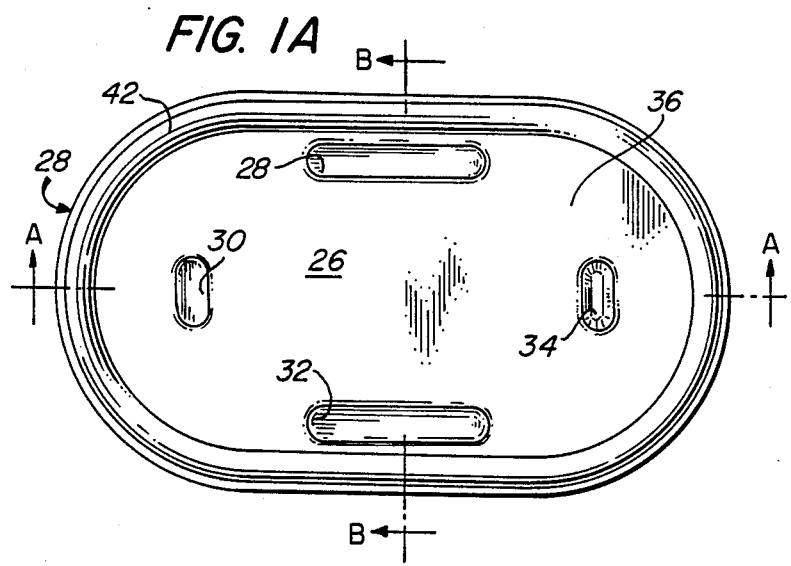
FIG. 1A shows a top view of the improved plug of FIG. 1.
Figure 1C:
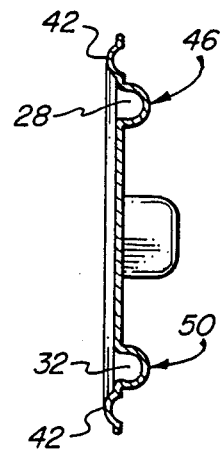
FIG. 1C shows a side view of the plug assembly of FIG. 1A in cross-section taken along the lines B—B of FIG. 1A.

In FIG. 1A, depressions 28 and 32 form corresponding protrusions 46 and 50, as shown in FIG. 1C, for engaging the sidewall 22 of aperture 20 and therefore substantially restricting the movement of plug 12 along the axis B—B of FIG. 1A. Protrusions 46 and 50 need not completely abut the sidewall 22 so long as appropriately small tolerances, preferably in the range of 0.01-0.2 inch, are maintained.

Figure 1B:
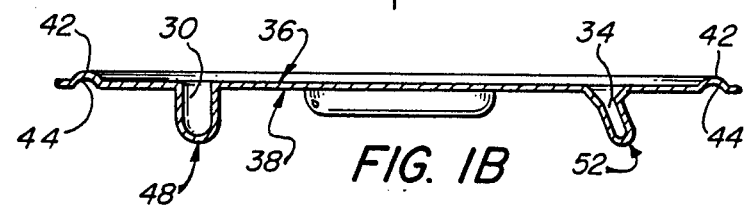
FIG. 1B shows a side view of the plug of FIG. 1A in cross-section taken along the lines A—A of FIG. 1A

Also, in FIG. 1A, depressions 30 and 34 form protuberances 48 and 52, as shown in FIG. 1B, for engaging the sidewall 22 of aperture 20 and substantially restricting the movement of plug 12 along the axis A—A of FIG. 1A. Furthermore, as seen in FIG. 1B, protuberance 52 extends in a radially outward direction from protuberance 48 at an acute angle to planar side 38 to grippingly or lockingly engage the workpiece 14 in the region of juncture 24 where the sidewall 22 meets the inner surface 18. This protuberance, or finger, 52 is diametrically opposed to protuberance 48 along axis A—A, and the distance between the two is chosen with respect to the size of the aperture 20 so that a snug fit is obtained against the sidewall 22. In this manner, plug 12 is restrained from falling out or being removed from aperture 20.

Plug 12 can be installed into the wormpiece 14 in several ways. In one preferred way, protuberance 52 is initially straight, or substantially perpendicular to the second side 38 and the plane of the body 26. After the plug 12 is dropped or inserted into the aperture 20, a shaped bending tool 100 shown in FIG. 5 is inserted into the depression 34 and torque is applied to bend the protuberance 52 in a radially outward direction to engage the workpiece 14 adjacent the sidewall 20 in a locking or gripping fashion. For this embodiment, the finger 52 is preferably made of a material sufficiently pliable to permit such bending, but having sufficient spring-like qualities so as to exert a locking force against the workpiece once the bending torque is removed.

In another preferred manner of inserting plug 12, finger 52 is already formed at an angle, preferably an angle A of between about 45 to about 89 degrees, and most preferably at an angle of about 70 degrees, and is angled away from its diametrically opposed protrusion 48. The distance between finger 52 and protuberance 48 is chosen so that protuberance 48 and its corresponding end of body 26 resist dropping into place in aperture 20 until a force, such as a blow by hammering, is applied in the vicinity of protuberance 48. For installation, finger 52 is first dropped into aperture 20. A force is then applied in the vicinity of protuberance 48, thereby snapping or popping plug 12 into place. In this embodiment, the body 26 is preferably made of a material having a sufficient spring-like quality that can flex to the extent necessary to insert the plug and then spring back to exert the necessary retaining force against the workpiece and its sidewall. The bending tool of FIG. 5 can also be used with this embodiment to aid in bending finger 52 to pop or snap body 26 in or out as desired.

Another preferred embodiment of the present invention of the present invention is shown in FIG. 3, including FIGS. 3A, 3B, and 3C, which is substantially like the embodiment of FIG. 1 except that two angled fingers are used instead of one. In describing FIGS. 3A, 3B, and 3C, the same figure numbers are used except for primes for corresponding parts. The difference between the embodiment of FIG. 1 and that of FIG. 3 is that protuberance 48' is also a finger diametrically opposed to finger 52' along axis C—C. Protuberances 46' and 50' keep plug 12' aligned with respect to axis D—D, while fingers 48' and 52' keep plug 12' aligned along axis C—C as well as engage the workpiece in the vicinity of junction 20' to grippingly or lockingly engage the sidewall and keep the plug locked in place. The bending tool or key 100 of FIG. 5 can also be used to assist in installing plug 12' in its corresponding aperture. Also, if body 26' is made from a material having a sufficient spring constant, plug 12' can similarly be snapped into place by positioning fingers 48' and 52' at the entrance to the aperture and applying an inwardly directed force to snap or pop plug 12' into the aperture.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. An improved plug for engaging a workpiece to close an aperture extending therethrough, said workpiece having an outer surface and an inner surface, said aperture being defined by at least one sidewall extending from said outer to said inner surface, said plug comprising:

a relatively thin substantially planar-shaped body defined by a perimeter, said perimeter being of a sufficient magnitude to permit said body to completely cover said aperture, said body having no openings therethrough, said body having a first side for facing away from said aperture and a second side for facing toward said aperture and abutting said workpiece in the region of said aperture;

at least two means for aligning said body with respect to said sidewall formed on said body adjacent said perimeter and extending into said aperture and engaging said sidewall to substantially restrict the movement of the body with respect to the aperture, at least one of said aligning means being positioned for aligning said body along a first axis with respect to said workpiece, and at least one aligning means being positioned for aligning said body along a second axis substantially perpendicular to said first axis with respect to said workpiece; and finger means included in at least one said aligning means extending from the plane of said body adjacent the perimeter thereof at an acute angle to said plane, said finger means being formed by a shaped depression in said first side of said body and a corresponding protuberance from said second side of said body, said depression lying along an axis disposed at an acute angle to said second side, said depression further having a depth sufficient to permit said finger means to engage said juncture, said finger means further having associated therewith a diametrically opposed aligning means for engaging the sidewall, said finger means being formed from a material having a sufficient springlike quality to cooperate with said diametrically opposed aligning means to permit snapping of said body into place in said aperture, said finger means being disposed for contacting the workpiece adjacent the juncture between the sidewall and the inner surface of the workpiece for retaining said plug in said aperture in a relatively snug manner.

2. The improved plug of claim further comprising two diametrically opposed aligning means lying along an axis substantially perpendicular to the axis established by said finger means and its diametrically opposed alignment means.

3. The improved plug of claim 2, wherein said alignment means are formed by shaped depressions in said first side of said body adjacent said perimeter, each depression having associated therewith a correspondingly shaped protuberance from the second side of said body, each said protuberance for extending into said aperture and cooperating with said sidewall to align said body with respect to said aperture.

4. The improved plug of claim 1, wherein said depression forming said finger means is adapted to mate with means for bending said finger, whereby said acute angle can be adjusted to appropriately retain said plug in said aperture.

5. The improved plug of claim 4 further comprising a flange extending around said body adjacent said perimeter thereof, said flange further forming a groove open to the second side of said body, said groove adapted for receiving a sealant to provide a relatively secure seal between said second side of said plug and said outer surface of said workpiece to thereby sealingly close said aperture.

6. The plug of claim 5, wherein said acute angle is in the range of about 45 to about 89 degrees.

7. An improved plug for engaging a workpiece to close an aperture extending therethrough, said workpiece forming an outer surface and an inner surface, said aperture being defined by at least one sidewall extending from said outer to said inner surface along a juncture therebetween; said plug comprising:

a relatively thin, substantially planar-shaped body defined by a perimeter of sufficient magnitude to permit said body to completely cover said aperture, said body further having a first side for facing away from said aperture and a second side for facing toward said aperture and abutting said workpiece in the region of said aperture, said body being free of openings therein between said first and second sides;

at least one shaped protuberance formed in said second side of said body by a corresponding depression formed in said first side adjacent said perimeter, said protuberance being adapted to extend into said aperture and engage said sidewall to substantially restrict the movement of the plug with respect to the aperture to align said plug along a first axis with respect to said workpiece;

at least one finger means protruding from said second side and corresponding to a depression formed in said first side, said finger means having a shape and disposed at an angle to abut said sidewall adjacent said juncture, said finger means having a sufficient spring bias to exert a force in a radially outward direction against said sidewall at said juncture, said force being sufficient to inhibit the removal of said plug from said aperture, said finger means being adapted to align said plug along a second axis with respect to said workpiece, said second axis being substantially perpendicular to said first axis.

8. The improved plug of claim 7, wherein said aligning means comprises at least two shaped protuberances adjacent said perimeter and said lockingly engaging means comprises two finger means adjacent said perimeter, said two shaped protuberances being diametrically opposed along said first axis and said two finger means being diametrically opposed along said second axis, said two finger means being angled in radially outward directions away from each other to lockingly engage opposed sidewall regions and thereby retain said plug in said aperture in a relatively snug manner.

9. The improved plug of claim 8, wherein the depressions in said first side forming said two finger means are adapted to receive means for bending said finger means to adjust said angular orientation, said plug being adapted for ready insertion into said aperture and said bending means thereafter applied to bend said fingers in radially outward opposing directions to relatively firmly engage said workpiece in the region of said juncture and retain said plug in said workpiece.

10. The improved plug of claim 9, wherein said body is formed of a material having a spring constant sufficient to permit said body to flex about an axis perpendicular to a plane including both finger means when both said finger means are positioned in contact with opposing sidewalls of the aperture and a force is applied to the body in a direction defined from the outer surface of said workpiece towards the inner surface, whereby said body flexes in response to said force to permit said plug to be snapped into said aperture.

11. The plug of claim 10 further comprising a flange extending around the perimeter of said body adjacent said perimeter, said flange further forming a groove open to the second side of said body, said groove adapted for receiving a sealant to provide a relatively secure seal between said second side of said plug and said outer surface of said workpiece to thereby sealingly close said aperture.

12. An improved plug for engaging a wormpiece to close an aperture extending therethrough, said workpiece having an outer surface and an inner surface, said aperture being defined by at least one sidewall extending from said outer to said inner surface along a juncture therebetween, said plug comprising:
- a relatively thin body defined by a perimeter, said perimeter being of a sufficient size to permit said body to completely cover said aperture, said body having no openings therethrough, said body having a first side for facing away from said aperture and a second side for facing toward said aperture and abutting said workpiece in the region of said aperture;
- at least two means for aligning said body with respect to said sidewall formed on said body adjacent said perimeter and extending into said aperture and engaging said sidewall to substantially restrict the movement of the body with respect to the aperture, at least one of said aligning means being positioned for aligning said body along a first axis with respect to said workpiece, and at least one aligning means being positioned for aligning said body along a second axis substantially perpendicular to said first axis with respect to said workpiece; and
- finger means included in at least one said aligning means extending from the plane of said body adjacent the perimeter thereof, said finger means being formed by a shaped depression in said first side of said body and a corresponding protuberance from said second side of said body, said depression having a depth sufficient to permit said finger means to engage said juncture
- said finger means having a sufficient spring bias to exert a force in a radially outward direction against said sidewall at said juncture.

13. The improved plug of claim 12 wherein said finger means has associated therewith a diametrically opposed aligning means for engaging the sidewall, and wherein said plug further comprises two diametrically opposed aligning means lying along an axis substantially perpendicular to the axis established by said finger means and its diametrically opposed alignment means.

14. The improved plug of claim 13, wherein said aligning means are formed by shaped depressions in said first side of said body adjacent said perimeter, each depression having associated therewith a correspondingly shaped protuberance from the second side of said body, each said protuberance for extending into said aperture and cooperating with said sidewall to align said body with respect to said aperture.

15. The improved plug of claim 14, wherein said depression forming said finger means is adapted to mate with means for bending said finger, whereby said finger means may be adjusted to extend from said body at an acute angle thereto, and wherein said acute angle can be adjusted to retain said plug in said aperture.

16. The improved plug of claim 15 further comprising a flange extending around said body adjacent said perimeter thereof, said flange forming a groove open to the second side of said body, said groove adapted for receiving a sealant to provide a relatively secure seal between said second side of said plug and said outer surface of said workpiece to thereby sealingly close said aperture.

* * * * *